US012639631B2

(12) United States Patent
Zhu et al.

(10) Patent No.: US 12,639,631 B2
(45) Date of Patent: May 26, 2026

(54) SPECTRAL CLUSTERING METHOD AND SYSTEM BASED ON UNIFIED ANCHOR AND SUBSPACE LEARNING

(71) Applicant: ZHEJIANG NORMAL UNIVERSITY, Jinhua (CN)

(72) Inventors: Xinzhong Zhu, Jinhua (CN); Huiying Xu, Jinhua (CN); Miaomiao Li, Jinhua (CN); Wenxuan Tu, Jinhua (CN); Mengjing Sun, Jinhua (CN); Hongbo Li, Jinhua (CN); Jianping Yin, Jinhua (CN); Jianmin Zhao, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 522 days.

(21) Appl. No.: 18/277,824

(22) PCT Filed: Jun. 15, 2022

(86) PCT No.: PCT/CN2022/098949
§ 371 (c)(1),
(2) Date: Aug. 18, 2023

(87) PCT Pub. No.: WO2022/267954
PCT Pub. Date: Dec. 29, 2022

(65) Prior Publication Data
US 2024/0161004 A1     May 16, 2024

(30) Foreign Application Priority Data

Jun. 24, 2021   (CN) ........................ 202110706960.X
Nov. 10, 2021   (CN) ........................ 202111326414.X

(51) Int. Cl.
*G06N 20/00*         (2019.01)
(52) U.S. Cl.
CPC ................................... *G06N 20/00* (2019.01)

(58) Field of Classification Search
CPC ......... G06N 20/00; G06F 18/23; G06F 18/25; G06F 18/214
See application file for complete search history.

(56) References Cited

U.S. PATENT DOCUMENTS

2020/0074220 A1     3/2020   Zhang et al.

FOREIGN PATENT DOCUMENTS

CN          109002854 A      12/2018
CN          112990265 A       6/2021
(Continued)

OTHER PUBLICATIONS

Kang Z, Zhou W, Zhao Z, Shao J, Han M, Xu Z. Large-scale multi-view subspace clustering in linear time. InProceedings of the AAAI conference on artificial intelligence Apr. 3, 2020 (vol. 34, No. 04, pp. 4412-4419). (Year: 2020).*
(Continued)

*Primary Examiner* — K C Chen
(74) *Attorney, Agent, or Firm* — Bayramoglu Law Offices LLC

(57) ABSTRACT

A spectral clustering method and system based on unified anchor and subspace learning is provided. The spectral clustering method based on unified anchor and subspace learning includes: S1: acquiring a clustering task and a target data sample; S2: performing unified anchor learning on multi-view data corresponding to the acquired clustering task and the acquired target data sample, and adaptively constructing an objective function corresponding to an anchor graph according to a learned unified anchor; S3: optimizing the constructed objective function by using an alternating optimization method to obtain an optimized unified anchor graph; and S4: performing spectral clustering on the obtained optimized unified anchor graph to obtain a final clustering result.

6 Claims, 8 Drawing Sheets b) Proposed strategy

(56)                     References Cited

FOREIGN PATENT DOCUMENTS

CN          113610103  A     11/2021
CN          114065850  A      2/2022

OTHER PUBLICATIONS

Zhang C, Hu Q, Fu H, Zhu P, Cao X. Latent multi-view subspace clustering. InProceedings of the IEEE conference on computer vision and pattern recognition 2017 (pp. 4279-4287). (Year: 2017).*

Tang C, Zhu X, Liu X, Li M, Wang P, Zhang C, Wang L. Learning a joint affinity graph for multiview subspace clustering. IEEE Transactions on Multimedia. Dec. 24, 2018;21(7):1724-36. (Year: 2018).*

Mengjing Sun, et al., Scalable Multi-view Subspace Clustering with Unified Anchors, MM '21, Oct. 20-24, 2021, Virtual Event, China.

Quanxue Gao, et al., Tensor-SVD Based Graph Learning for Multi-View Subspace Clustering, The Thirty-Fourth AAAI Conference on Artificial Intelligence (AAAI-20), 2020, pp. 3930-3937.

Hongwei Yong, et al., Model Inconsistent but Correlated Noise: Multi-view Subspace Learning with Regularized Mixture of Gaussians, 2018, pp. 1-8.

Deng Cai, et al., Large Scale Spectral Clustering Via Landmark-Based Sparse Representation, IEEE Transactions on Cybernetics, 2015, pp. 1669-1680, vol. 45 No.8.

* cited by examiner

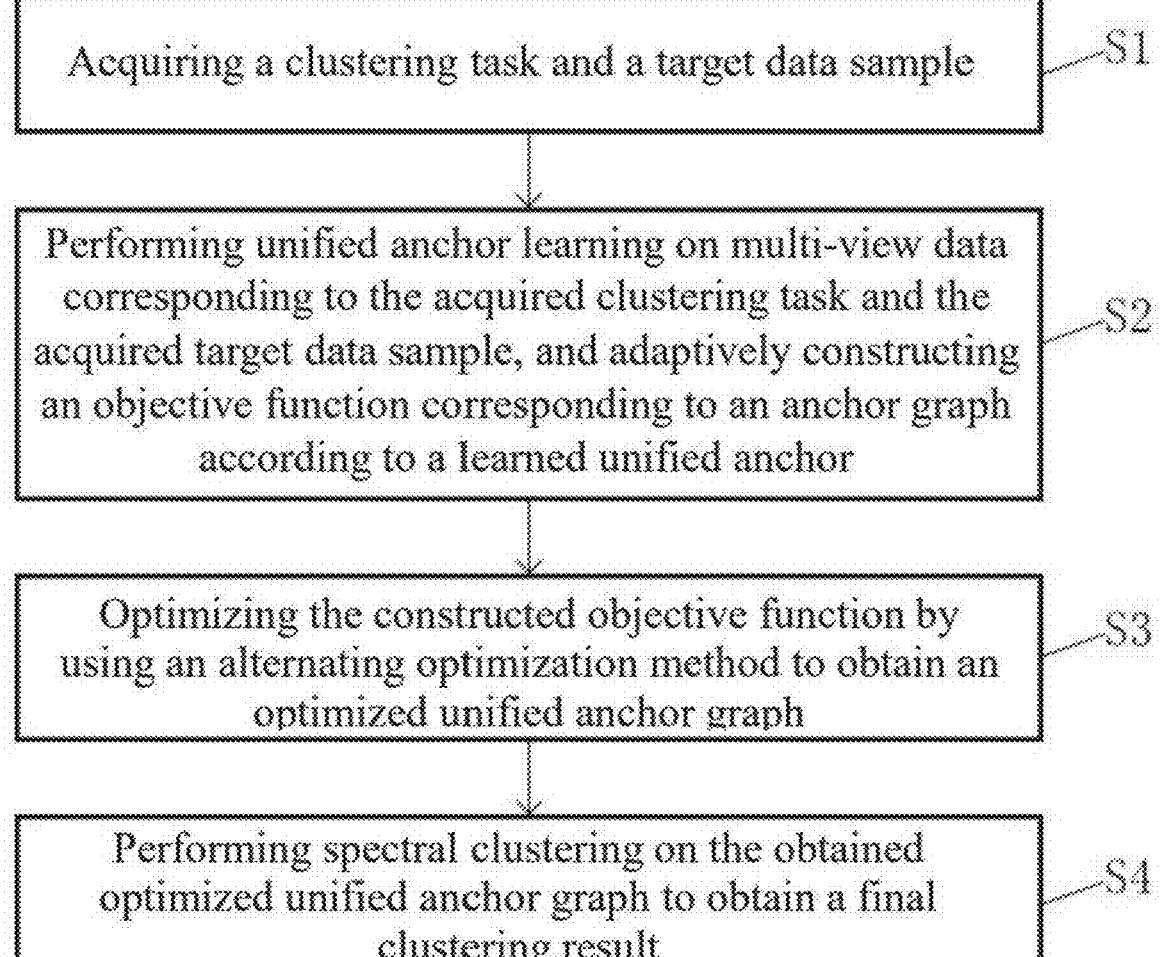

Acquiring a clustering task and a target data sample — S1

Performing unified anchor learning on multi-view data corresponding to the acquired clustering task and the acquired target data sample, and adaptively constructing an objective function corresponding to an anchor graph according to a learned unified anchor — S2

Optimizing the constructed objective function by using an alternating optimization method to obtain an optimized unified anchor graph — S3

Performing spectral clustering on the obtained optimized unified anchor graph to obtain a final clustering result — S4

FIG. 1

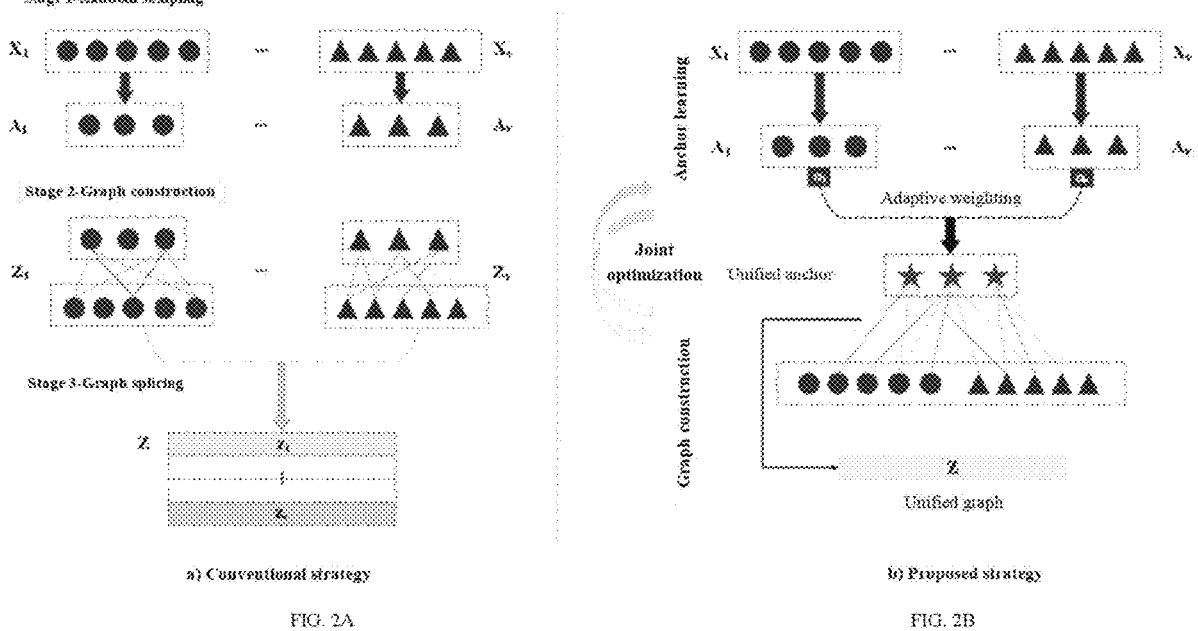
FIG. 2A                  FIG. 2B

(a) Complete graph of LMVSC

(b) Complete graph of ours

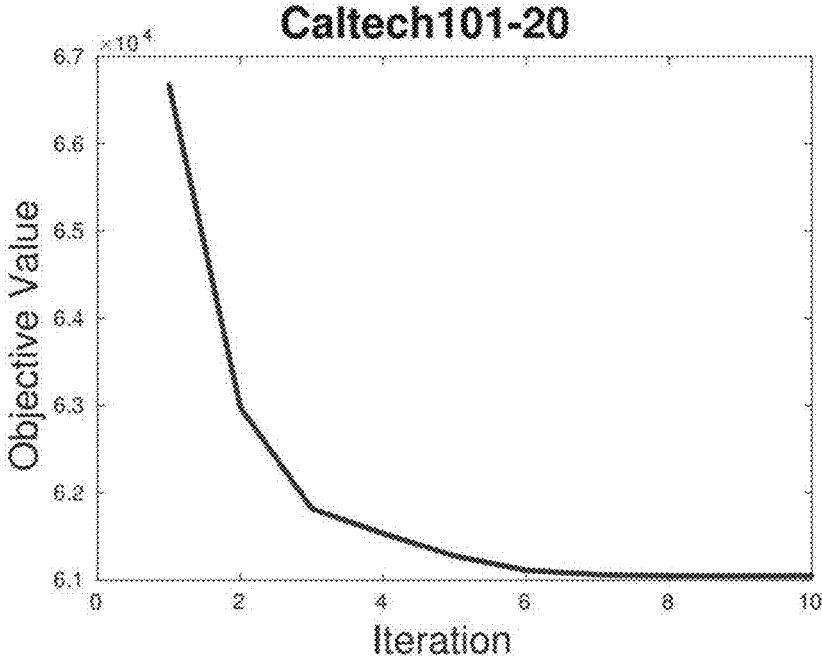
(a) Caltech101-20
FIG. 5A
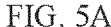
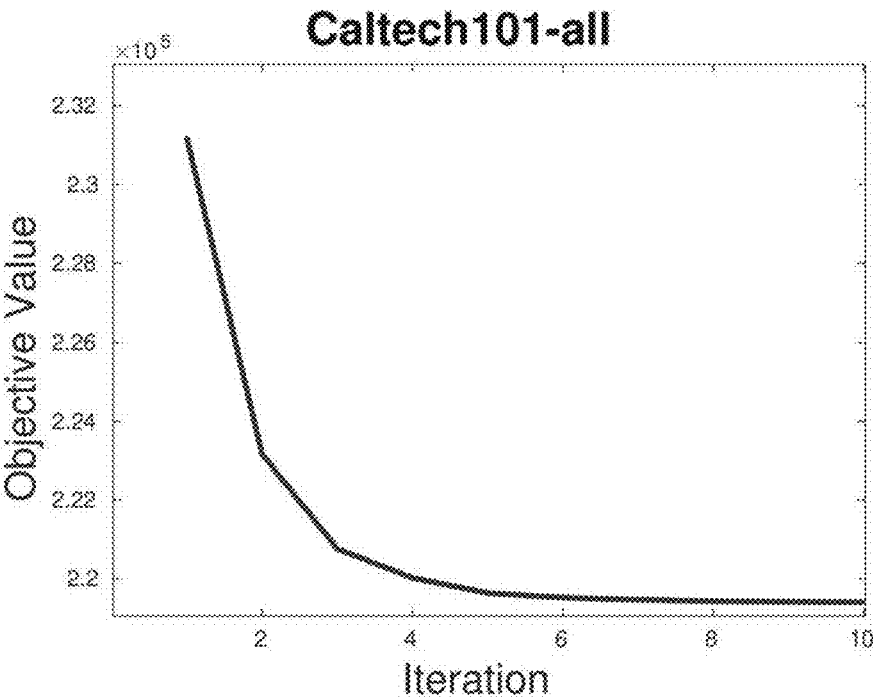
(b) Caltech101-all
FIG. 5B (c) SUNRGBD (d) NUSWIDEOBJ (e)  AwA

SPECTRAL CLUSTERING METHOD AND SYSTEM BASED ON UNIFIED ANCHOR AND SUBSPACE LEARNING

CROSS REFERENCE TO THE RELATED APPLICATIONS

This application is the national phase entry of International Application No. PCT/CN2022/098949, filed on Jun. 15, 2022, which is based upon and claims priority to Chinese Patent Applications No. 202110706960.X, filed on Jun. 24, 2021, and 202111326414.X, filed on Nov. 10, 2021, the entire contents of which are incorporated herein by reference.

TECHNICAL FIELD

The present application relates to the technical field of machine learning, and in particular to a spectral clustering method and system based on unified anchor and subspace learning.

BACKGROUND

Multi-view clustering integrates diversity and complementary information among views for clustering, and is an important unsupervised learning method in the machine learning and multimedia data mining communities. Many multi-view clustering algorithms have been proposed in existing literature, among which multi-view subspace clustering is very popular. Multi-view subspace aggregation (MVSC) usually seeks a unified subspace structure from a fused multi-view data representation, and then separates the data in the subspaces, that is, the following two-step strategy: i) graph construction: low-dimensional subspace representations are obtained from multi-view data to obtain view-specific similarity graphs or fusion graphs; and ii) spectral clustering: spectral clustering is performed on the fused graph. MVSC has been widely used in various applications, such as image classification, face clustering and community detection, by capturing nonlinear structures and preserving pairwise similarity in the graphs.

Although the existing MVSC method has achieved great success in improving clustering performance, one major disadvantage of further application of MVSC is the cubic time complexity with respect to the number of samples, and the first graph construction stage needs to solve the subproblem of n-convex quadratic programming with a time complexity of at least $O(n^3)$ per iteration. In addition, the second spectral clustering process requires $O(n^3)$ for singular value decomposition (SVD). Therefore, designing scalable MVSC algorithms to handle large-scale multi-view data is still a yet to be settled problem.

In recent years, anchor-based MVSC has been proposed to alleviate the high complexity of conventional subspace methods. By selecting k anchors by independent sampling, the original global map with a size of n×n is replaced with a corresponding anchor graph with a size of n×k. The equal weights of each anchor graph are fused into the consensus graph, and then spectral clustering is performed to obtain the final clustering result. The overall time complexity of the anchor-based multi-view subspace clustering method can be reduced to O(n), and can be applied to large-scale tasks.

Existing anchor-based multi-view subspace clustering strategies can be further improved with the following considerations. First, the anchor for each view is independently generated by k-means clustering or random sampling, and is not associated with other view information. Furthermore, the separation of the heuristic sampling and graph construction process results in weakly discriminating anchors. Thus, the selected anchors may not reflect the actual data distribution and generate an imprecise graph structure. Second, without sufficient information fusion, the complementary multi-view information is not well used because the graphs are independently constructed from the anchors of the corresponding views. Both of the above limitations of existing methods degrade clustering performance.

SUMMARY

For the defects of the prior art, an objective of the present application is to provide a spectral clustering method and system based on unified anchor and subspace learning.

In order to achieve the above objective, the present application uses the following technical solutions.

A spectral clustering method based on unified anchor and subspace learning includes:

S1: acquiring a clustering task and a target data sample;

S2: performing unified anchor learning on multi-view data corresponding to the acquired clustering task and the acquired target data sample, and adaptively constructing an objective function corresponding to an anchor graph according to a learned unified anchor;

S3: optimizing the constructed objective function by using an alternating optimization method to obtain an optimized unified anchor graph; and S4: performing spectral clustering on the obtained optimized unified anchor graph to obtain a final clustering result.

Further, the adaptively constructing an objective function corresponding to an anchor graph according to a learned unified anchor in the step S2 is represented as:

$$\min_{\alpha, W_i, A, Z} \sum_{i=1}^{v} \alpha_i^2 \|X_i - W_i A Z\|_F^2 + \|Z\|_F^2$$

$$\text{s.t. } \alpha^T 1 = 1, W_i^T W_i = I_d, A^T A = I_m, Z \geq 0, Z^T 1 = 1$$

wherein $\alpha$ represents a weight of a view; $W_i$ represents an anchor projection matrix of the $i^{th}$ view; $A \in R^{d \times m}$ represents a unified anchor matrix, d represents a common dimension of an entire view, and m represents the number of anchors; z represents a unified anchor graph with m×n dimensions; v represents v views; $\alpha_i$ represents a weight of the $i^{th}$ view; $X_i \in R^{d_i \times n}$ represents the $i^{th}$ view of original data, $d_i$ represents a dimension of a corresponding view, and n represents the number of samples; $\alpha^T$ represents a transpose of $\alpha$;

$$W_i^T$$

represents a transpose of $W_i$; $Z^T$ represents a transpose of Z; $A^T$ represents a transpose of A; $I_d \in R^{d \times d}$ represents an identity matrix; $I_m \in R^{m \times m}$ represents an identity matrix; and 1 represents a vector with all elements being one.

Further, the optimizing the constructed objective function by using an alternating optimization method in the step S3 specifically includes:

A1: fixing variables A, Z, and $\alpha_i$, wherein the optimization of $W_i$ in the objective function is represented as:

$$\min_{W_i} \sum_{i=1}^{v} \alpha_i^2 \|X_i - W_i AZ\|_F^2, \text{ s.t. } W_i^T W_i = I_d$$

A2: updating A, and fixing $W_i$, Z, and $\alpha_i$, wherein the optimization of A in the objective function is represented as:

$$\min_{A} \sum_{i=1}^{v} \alpha_i^2 \|X_i - W_i AZ\|_F^2, \text{ s.t. } A^T A = I_m$$

A3: updating Z, and fixing variables $W_i$, A, and $\alpha_i$, wherein the optimization of Z in the objective function is represented as:

$$\min_{Z} \sum_{i=1}^{v} \alpha_i^2 \|X_i - W_i AZ\|_F^2 + \|Z\|_F^2$$

$$\text{s.t. } Z \geq 0, Z^T 1 = 1$$

A4: updating $\alpha_i$, and fixing other variables $W_i$, A, and Z, wherein the optimization of $\alpha_i$ in the objective function is represented as:

$$\min_{\alpha_i} \sum_{i=1}^{v} \alpha_i^2 M_i^2, \text{ s.t. } \alpha^T 1 = 1$$

wherein $M_i = \|X_i - W_i AZ\|_F$ represents reconstruction loss of $x_i$.

Further, the step A1 further includes:

removing items irrelevant to $W_i$ by the Frobenius norm, and converting the formula in the step A1 into the following equivalent problem, which is represented as:

$$\min_{W_i} T_r(W_i^T B_i), \text{ s.t. } W_i^T W_i = I_d$$

wherein $B_i = X_i Z^T A^T$ represents the product of matrices.

Further, the step A2 further includes:

removing items irrelevant to A by the Frobenius norm, and converting the formula in the step A2 into the following equivalent problem, which is represented as:

$$\max_{A} T_r(A^T C), \text{ s.t. } A^T A = I_m$$

wherein $$VC = \sum_{i=1}^{v} \alpha_i^2 W_i^T X_i Z^T$$

represents the product of matrices.

Further, the step A3 further includes:

solving a solution to each row of Z by the QP problem, wherein the formula in the step A3 is represented as:

$$\min \frac{1}{2} Z_{:,j}^T H Z_{:,j} + f^T Z_{:,j}$$

$$\text{s.t. } Z \geq 0, Z_{:,j}^T 1 = 1$$

wherein j represents each column element in the matrix.

Further, the constructed objective function is optimized by using an alternating optimization method in the step S3, wherein a termination condition is to find the minimum value or to reach a convergence condition.

Correspondingly, a spectral clustering system based on unified anchor and subspace learning includes:

an acquisition module configured to acquire a clustering task and a target data sample;

a construction module configured to perform unified anchor learning on multi-view data corresponding to the acquired clustering task and the acquired target data sample, and adaptively construct an objective function corresponding to an anchor graph according to a learned unified anchor;

an optimization module configured to optimize the constructed objective function by using an alternating optimization method to obtain an optimized unified anchor graph; and a clustering module configured to perform spectral clustering on the obtained optimized unified anchor graph to obtain a final clustering result.

Further, the adaptively constructing an objective function corresponding to an anchor graph according to a learned unified anchor in the construction module is represented as:

$$\min_{\alpha, W_i, A, Z} \sum_{i=1}^{v} \alpha_i^2 \|X_i - W_i AZ\|_F^2 + \|Z\|_F^2$$

$$\text{s.t. } \alpha^T 1 = 1, W_i^T W_i = I_d, A^T A = I_m, Z \geq 0, Z^T 1 = 1$$

wherein $\alpha$ represents a weight of a view; $W_i$ represents an anchor projection matrix of the $i^{th}$ view; $A \in R^{d \times m}$ represents a unified anchor matrix, d represents a common dimension of an entire view, and m represents the number of anchors; z represents a unified anchor graph with m×n dimensions; v represents v views; $\alpha_i$ represents a weight of the $i^{th}$ view; $X_i \in R^{d_i \times n}$ represents the $i^{th}$ view of original data, $d_i$ represents a dimension of a corresponding view, and n represents the number of samples; $\alpha^T$ represents a transpose of $\alpha$;

$$W_i^T$$

represents a transpose of $W_i$; $Z^T$ represents a transpose of Z; $A^T$ represents a transpose of A; $I_d \in R^{d \times d}$ represents an identity matrix; $I_m \in R^{m \times m}$ represents an identity matrix; and 1 represents a vector with all elements being one.

Further, the optimizing the constructed objective function by using an alternating optimization method in the optimization module specifically includes:

fixing variables A, Z, and $\alpha_i$, wherein the optimization of $W_i$ in the objective function is represented as:

$$\min_{W_i} \sum_{i=1}^{v} \alpha_i^2 \|X_i - W_i AZ\|_F^2, \text{ s.t. } W_i^T W_i = I_d$$

5 updating A, and fixing $W_i$, Z, and $\alpha_i$, wherein the optimization of A in the objective function is represented as:

$$\min_A \sum_{i=1}^{v} \alpha_i^2 \|X_i - W_i AZ\|_F^2, \text{ s.t. } A^T A = I_m$$

updating Z, and fixing variables $W_i$, A, and $\alpha_i$, wherein the optimization of Z in the objective function is represented as:

$$\min_Z \sum_{i=1}^{v} \alpha_i^2 \|X_i - W_i AZ\|_F^2 + \|Z\|_F^2$$

$$\text{s.t. } Z \geq 0, Z^T 1 = 1$$

updating $\alpha_i$, and fixing other variables $W_i$, A, and Z, wherein the optimization of $\alpha_i$ in the objective function is represented as:

$$\min_{\alpha_i} \sum_{i=1}^{v} \alpha_i^2 M_i^2, \text{ s.t. } \alpha^T 1 = 1$$

wherein $M_i = \|X_i - W_i AZ\|_F$ represents reconstruction loss of $x_i$.

Compared with the prior art, the present application provides a novel spectral clustering method and system with unified anchor and subspace learning, wherein this method integrates anchor learning and graph construction into a unified framework, so that the learned anchor can represent actual data distribution more accurately. Compared with existing anchor graph fusion strategies, an adaptive method is used to make consistent anchor graphs capture/obtain complementary information among views while learning the importance of different views. A large number of experimental results prove the superiority in the clustering performance and the runtime.

BRIEF DESCRIPTION OF THE DRAWINGS

FIG. 1 is a flowchart of a spectral clustering method based on unified anchor and subspace learning according to Embodiment 1;

FIGS. 2A and 2B are schematic diagrams of a conventional anchor-based multi-view subspace strategy framework according to Embodiment 1 and the SMVSC strategy herein;

FIGS. 5A-5E are schematic diagrams of the targets of the method according to Embodiment 2 on five benchmark datasets.

DETAILED DESCRIPTION OF THE EMBODIMENTS

Figure 3:
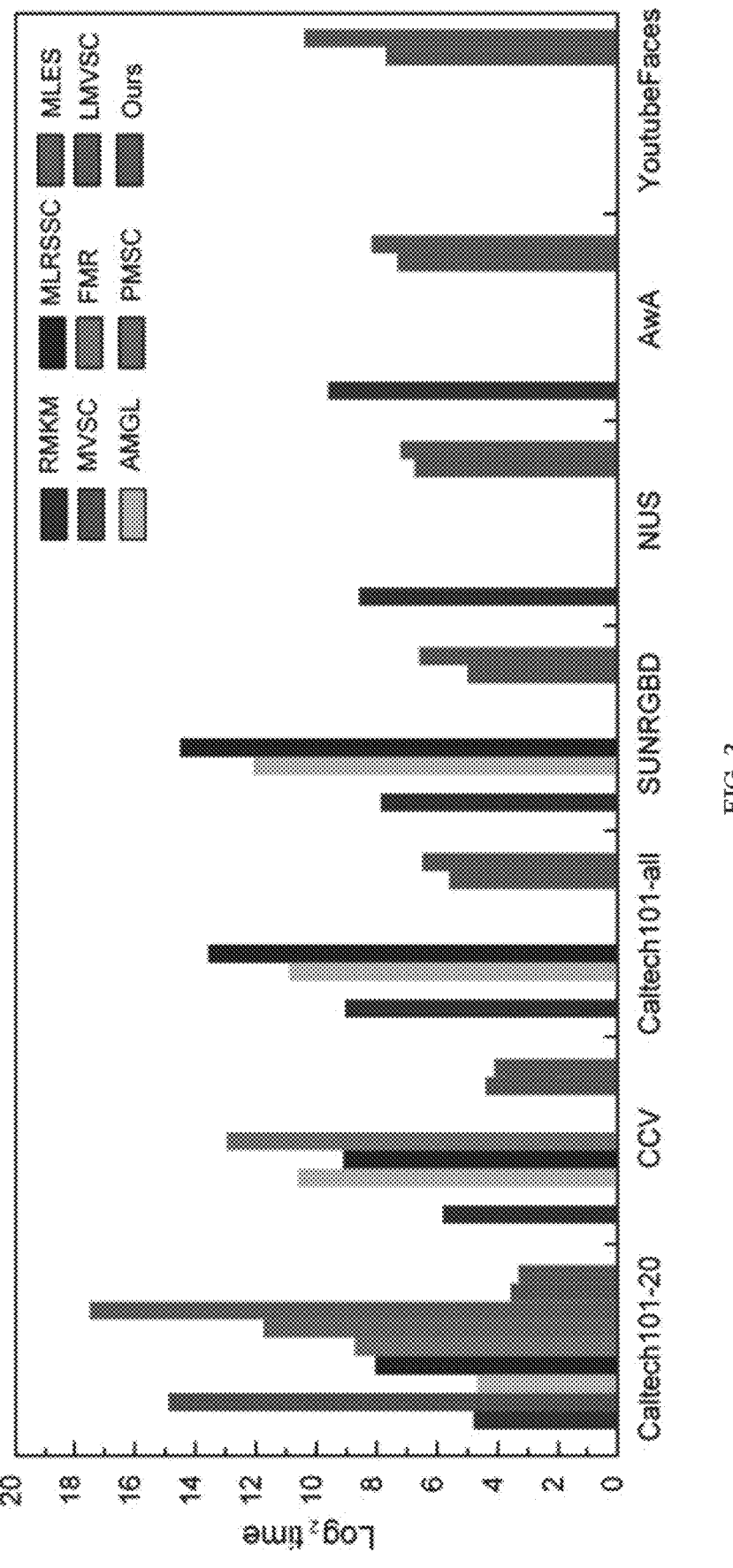
FIG. 3 is a schematic diagram of the comparison method and the runtime of more than seven datasets according to Embodiment 2.

The following describes the embodiments of the present application by specific examples, and other advantages and effects of the present application will be readily apparent to those skilled in the art from the disclosure of the present application. The present application can also be implemented or applied through other different specific embodiments, and various modifications or changes can be made to the details in this specification based on different viewpoints and applications without departing from the spirit of the present application. It should be noted that the following embodiments and features in the embodiments can be combined with each other without conflict.

The purpose of the present application is to combine anchor learning and graph construction into a unified framework, so that the learned consistent anchors can be optimized jointly with a projection matrix of each view. Thus, the learned anchors can accurately represent specific latent data, resulting in a better graph structure/a better constructed graph structure. The recovery of the partial view also has an influence on the specific details of the unified graph by the single view, and the present application provides a spectral clustering method and system based on unified anchor and subspace learning.

Anchor learning and graph construction are combined into a unified framework, where consistent anchors are jointly optimized with their view permutation matrices. Thus, the learned anchors can accurately represent the actual latent data distribution, thereby better construction the graph structure. The importance of each view is also adaptively measured by the contribution of the single view to the unified graph. Most importantly, the linear time complexity of the algorithm proposed in the present application enables its application to large-scale multi-view data. Then, a four-step surrogate optimization algorithm with proven convergence is proposed to solve the resulting optimization problem.

Embodiment 1

This embodiment provides a spectral clustering method based on unified anchor and subspace learning, as shown in FIG. 1, which includes:

S1: acquiring a clustering task and a target data sample;

S2: performing unified anchor learning on multi-view data corresponding to the acquired clustering task and the acquired target data sample, and adaptively constructing an objective function corresponding to an anchor graph according to a learned unified anchor;

S3: optimizing the constructed objective function by using an alternating optimization method to obtain an optimized unified anchor graph; and S4: performing spectral clustering on the obtained optimized unified anchor graph to obtain a final clustering result.

The key to evaluating the performance of multi-view subspace clustering is the quality of the constructed graph in the algorithm. In a conventional anchor-based multi-view subspace clustering framework, three stages are mainly included: in the first stage, anchors are heuristically selected and then fixed anchors are selected by sampling from the original data in each view. In the second stage, the anchors selected by each view are mutually independent and construct anchor graphs, and no information is exchanged among the views. In the third stage, specific anchor graphs formed by all the views are directly and equivalently connected into a unified anchor graph, and then spectral clustering is performed through the anchor graphs to obtain a final clustering result. The three stages are independent of each other, with no interaction among views. Unlike the conventional strategy, this embodiment provides a scalable multi-view subspace clustering algorithm based on consistent anchors, and the algorithm mainly includes two stages: anchor learning and graph construction. In the first stage, this embodiment performs anchor learning on the large-scale multi-view data, so that the learned anchor can more accurately represent the distribution of actual data. In the second stage, considering that the importance of each view is different, this embodiment adaptively constructs an anchor graph through the learned consistent anchors, and then performs spectral clustering through the consistent anchor graph to obtain a final clustering result. The two stages are mutually promoted and jointly optimized, so that the constructed consistent anchor graph not only has complementary information among views, but also has a stronger discriminant graph structure. The algorithm breaks the limitation of the conventional method and effectively improves the clustering performance.

In the step S2, unified anchor learning is performed on multi-view data corresponding to the acquired clustering task and the acquired target data sample, and an objective function corresponding to an anchor graph is adaptively constructed according to a learned unified anchor.

Each point in the self-expression strategy is represented as all original points, which is widely used for multi-view subspace clustering. While global relationships are well explored, the scalability of multi-view subspace clustering is limited by the optimization time and storage costs associated with global graphs. Furthermore, it is not necessary and redundant to delineate one point with all samples. Thus, this embodiment uses an anchor strategy to select a small set of data points, referred to as the anchor, to reconstruct the underlying subspace and capture the manifold structure. In the prior art, the selection of anchors can be obtained by random or uniform sampling from the original data space, or by using clustering centers obtained by performing k-means. However, in previous strategies, anchors are fixed after initialization, so that anchor learning (AL) and graph construction are separated from each other. This embodiment integrates these two processes into one common framework, resulting in more discriminating anchors.

Furthermore, generating anchors from independent views can result in different sets of anchors, making graph fusion difficult. The complementary information among views has not been well explored.

Aiming at the problems, the unified anchor obtained through projection in this embodiment obtains a unified anchor graph with complementary view information and a more discriminative anchor structure through adaptive learning. Mathematically, the objective function corresponding to the unified anchor graph of this embodiment is represented as:

$$\min_{\alpha, W_i, A, Z} \sum_{i=1}^{v} \alpha_i^2 \|X_i - W_i A Z\|_F^2 + \|Z\|_F^2$$

$$\text{s.t. } \alpha^T 1 = 1, \; W_i^T W_i = I_d, \; A^T A = I_m, \; Z \geq 0, \; Z^T 1 = 1$$

wherein $\alpha$ represents a weight of a view; $W_i$ represents an anchor projection matrix of the $i^{th}$ view, and a unified anchor can be projected to a corresponding original data space; $A \in R^{d \times m}$ represents a unified anchor matrix, d represents a common dimension of an entire view, m represents the number of anchors, and in this embodiment, k is selected as a common dimension, the number of anchors $m \in \{k, 2k, 3k\}$ is selected, and the common dimension and the orthogonal constraint together limit A to be more discriminative; z represents a unified anchor graph with m×n dimensions; v represents v views; $\alpha_i$ represents a weight of the $i^{th}$ view; $X_i \in R^{d_i \times n}$ represents the $i^{th}$ view of original data, $d_i$ represents a dimension of a corresponding view, and n represents the number of samples; $\alpha^T$ represents a transpose of $\alpha$;

$$W_i^T$$

represents a transpose of $W_i$; $Z^T$ represents a transpose of Z; $A^T$ represents a transpose of A; $I_d \in R^{d \times d}$ represents an identity matrix; $I_m \in R^{m \times m}$ represents an identity matrix; and 1 represents a vector with all elements being one.

According to the conclusions of the existing literature [Gao Q, Xia W, Wan Z, et al. 2020. Tensor-SVD Based Graph Learning for Multi-View Subspace Clustering. In AAAI 3930-3937], [Yong H, Meng D, J Li, et al. 2018. Model Inconsistent but Correlated Noise: Multi-view Subspace Learning with Regularized Mixture of Gaussians], and [Cai D, Chen X. 2015. Large Scale Spectral Clustering Via Landmark-Based Sparse Representation. In IEEE Trans Cybern, 45(8):1669-1680], the left singular vector of the anchor graph Z is equal to the left singular vector of the complete graph $S = Z^T Z$. Therefore, in this embodiment, the left singular vector U is obtained by performing SVD on Z, and k-means is performed on U to obtain a final clustering result.

In the step S3, the constructed objective function is optimized by using an alternating optimization method to obtain an optimized unified anchor graph.

When all variables are considered simultaneously, the optimization problem in the objective function is not jointly convex. Therefore, this embodiment proposes an alternating optimization algorithm to optimize each variable, i.e., optimize one of the variables and fix the others. This embodiment then provides an overall framework for optimization algorithms and time/space complexity analysis.

A1: variables A, Z, and $\alpha_i$ are fixed, and the optimization of $W_i$ in the objective function is represented as:

$$\min_{W_i} \sum_{i=1}^{v} \alpha_i^2 \|X_i - W_i A Z\|_F^2, \text{ s.t. } W_i^T W_i = I_d$$

FIGS. 2A and 2B are comparison graphs of the conventional anchor-based multi-view subspace strategy framework and the SMVSC strategy diagram of this embodiment.

Since each $W_i$ is separated from each other in terms of corresponding views, term irrelevant to $W_i$ can be removed by the Frobenius norm, and the above formula is converted into the following equivalent problem, which is represented as:

$$\min_{W_i} T_r(W_i^T B_i), \text{ s.t. } W_i^T W_i = I_d$$

wherein $B_j = X_i Z^T A^T$ represents the product of matrices. Assuming that the singular value decomposition (SVD) of $B_i$ is $U \Sigma V^T$, the optimal $W_i$ can be easily obtained by computing UV T according to methods in the prior art.

9

A2: A is updated, $W_i$, Z, and $\alpha_i$ are fixed, and the optimization of A in the objective function is converted into the following problem and is represented as:

$$\min_A \sum_{i=1}^{v} \alpha_i^2 \|X_i - W_i AZ\|_F^2, \text{ s.t. } A^T A = I_m$$

Similar to the optimization of $W_i$ in the step A1, A is optimized, specifically, items irrelevant to A are removed through the Frobenius norm, and the optimization of the above formula is equal to the following form and is represented as:

$$\max_A T_r(A^T C), \text{ s.t. } A^T A = I_m$$

wherein $$C = \sum_{i=1}^{v} \alpha_i^2 W_i^T X_i Z^T$$

represents the product of matrices. Updating the optimal solution of the variable A may result in a multiplication of the left and right singular matrices of C.

A3: Z is updated, variables $W_i$, A, and $\alpha_i$ are fixed, and the optimization problem of updating variable Z can be rewritten as:

$$\min_Z \sum_{i=1}^{v} \alpha_i^2 \|X_i - W_i AZ\|_F^2 + \|Z\|_F^2$$

$$\text{s.t. } Z \geq 0, Z^T 1 = 1$$

The above optimization problem for Z can be easily expressed as the following quadratic programming (QP) problem, and the optimization can be solved by solving the QP problem for each line of Z, which is represented as:

$$\min \frac{1}{2} Z_{:,j}^T H Z_{:,j} + f^T Z_{:,j}$$

$$\text{s.t. } .Z \geq 0, Z_{:,j}^T 1 = 1$$

wherein j represents each column element in the matrix.

A4: $\alpha_i$ is updated, and other variables $W_i$, A, and Z are fixed to obtain an optimization problem of updating $\alpha_i$, wherein $M_i = \|X_i - W_i AZ\|_F$, which is represented as:

$$\min_{\alpha_i} \sum_{i=1}^{v} \alpha_i^2 M_i^2, \text{ s.t. } \alpha^T 1 = 1$$

The optimal $\alpha_i$ can be obtained directly according to the Cauchy-Buniakowsky-Schwarz inequality.

As the iterations proceed, the four variables in the above optimization are solved individually, and the other variables are fixed. Since each subproblem is strictly convex, the objective value decreases monotonically until a minimum is found or a convergence condition is reached. And it can be easily proved that the lower bound of the objective function is zero. The entire process of the above optimization is set forth in the algorithm of Table 1 below.

TABLE 1

| The algorithm is SMVSC |
| --- |
| Inputting: the number of input views is a dataset $\{X_i\}_{i=1}^{v}$ of v and the number of clusters k. |
| Initialization: A, Z and W are initialized as a zero matrix. $\alpha_i$ is initialized to $\frac{1}{v}$. |
| 1: Performing when not converging |
| 2: Updating $W_i$ by solving problems in Eq4 |
| 3: Updating A by solving problems in Eq6 |
| 4: Updating Z by solving problems in Eq8 |
| 5: Updating $\alpha_i$ by solving problems in Eq9 |
| 6: Ending |
| 7: Performing SVD on Z to obtain U |
| 8: Outputting: obtaining a final clustering result by using a k-means algorithm for U |

The complexity analysis is performed on the optimization process, specifically, the time complexity of the global optimization process is first analyzed and then several comparison methods are compared from the perspective of the dominant space complexity.

Analysis of Time Complexity:

The computational complexity consists of the optimization cost per variable. When $W_i$ is updated, performing SVD on $B_i$ requires $O(d_i d^2)$, and $O(d_i dk^2)$ is the time cost of performing matrix multiplication to obtain optimal $W_i$. Similar to updating $W_i$, updating A requires time complexity of $O(md^2)$ and $O(dmk^2)$ for SVD decomposition and matrix multiplication. When the QP problem of updating Z is solved, the cost of computing all columns is $O(nm^3)$. The time cost for computing $\alpha_i$ is only $O(1)$. Therefore, the total time cost of the optimization process is $$\sum_{i=1}^{v} (d_i d^2 + d_i dk^2) + md^2 + dmk^2 + nm^3.$$

Therefore, the computational complexity of the optimization algorithm proposed in this embodiment is the linear complexity $O(n)$.

After optimization, this embodiment performs SVD on Z to obtain a left singular matrix U, and obtains a final clustering result through a k-means. In post-processing, the computational complexity is $O(nm^2)$, which is also a linear complexity. Thus, a linear time algorithm is implemented both in the optimization process and in the post-processing process.

Analysis of Space Complexity:

In this embodiment, the main memory cost is matrices: $W_i \in R^{d_i \times k}$, $A \in R^{k \times m}$ and $Z \in R^{m \times n}$. Thus, the space complexity $mn + (h+m)k$ of the SMVSC of this embodiment, due to $$h = \sum_{i=1}^{v} d_i,$$

$m \ll n$, and $k \ll n$ herein, is $O(n)$.

The purpose of this embodiment is as follows.

(1) Unlike the conventional heuristic anchor sampling strategy, the anchor learning and the graph construction are integrated into a unified framework. The two processes are mutually promoted and jointly optimized, so that the learned anchors can more accurately represent the actual data distribution. Therefore, the obtained subspace graph structure has stronger discriminability, and the clustering performance is further improved.

(2) Compared with the existing anchor graph fusion strategy, the consistent anchor graph obtains complementary information among the views through a self-adaptive method, and meanwhile, the importance of different views is learned. More importantly, the proposed method of linear time complexity has proven to be a more efficient large-scale subspace clustering problem.

(3) An alternating optimization algorithm is designed to solve the result optimization problem and has proved to have convergence. A large number of experimental results prove the superiority in the clustering performance and the runtime. Furthermore, it is believed that the present application is the first to efficiently run MVSC on more than 100,000 samples compared with conventional multi-view subspace-based clustering methods.

This embodiment provides a novel scalable multi-view subspace clustering method with unified anchor, wherein this method integrates anchor learning and graph construction into a unified framework, so that the learned anchor can represent actual data distribution more accurately. Compared with existing anchor graph fusion strategies, an adaptive method is used to make consistent anchor graphs capture/obtain complementary information among views while learning the importance of different views.

Embodiment 2

The spectral clustering method based on unified anchor and subspace learning provided by this embodiment is different from Embodiment 1 in that:

this embodiment takes an image dataset as an example for explanation,

S1: acquiring a clustering task and a target data sample related to image data;

S2: performing unified anchor learning on multi-view data corresponding to the acquired clustering task and the acquired target data sample, and adaptively constructing an objective function corresponding to an anchor graph according to a learned unified anchor;

S3: optimizing the constructed objective function by using an alternating optimization method to obtain an optimized unified anchor graph; and S4: performing spectral clustering on the obtained optimized unified anchor graph to obtain a final clustering result.

The image data may be facial video image datasets, natural disaster image datasets, remote sensing image datasets, medical image datasets, crowd image datasets, crowd count datasets, and the like.

This embodiment evaluates the clustering properties of the method on seven widely used datasets.

The performance of SMVSC is compared with the six most advanced multi-view subspace clustering methods and with the two large scale-oriented methods.

TABLE 2

| Complexity analysis of comparison methods | | | |
|---|---|---|---|
| Method | Memory Cost | Time Complexity | Max Reported |
| RMKM | $(n + h)k$ | $O(n)$ | 30475 |
| MVSC | $2vn^2 + nk$ | $O(n^3)$ | 1230 |

TABLE 2-continued

| Complexity analysis of comparison methods | | | |
|---|---|---|---|
| Method | Memory Cost | Time Complexity | Max Reported |
| AMGL | $vn^2 + nk$ | $O(n^3)$ | 12613 |
| MLRSSC | $(v + 1)n^2$ | $O(n^3)$ | 2000 |
| FMR | $n^2 + nm$ | $O(n^3)$ | 10158 |
| PMSC | $2vn^2 + (v + 1)nk$ | $O(n^3)$ | 2386 |
| MLES | $n^2 + hm + mn$ | $O(n^3)$ | 544 |
| LMVSC | $vm(n + h)$ | $O(n^3)$ | 30000 |
| Ours | $mn + (h + m)k$ | $O(n)$ | 101499 |

For the analysis of time and space complexity, as shown in Table 2, most subspace-based multi-view clustering methods have $O(n^3)$ time complexity in the process described above. The main memory costs of the compared algorithms are calculated in Table 2. It is readily observed that the space complexity of most of the most advanced algorithms is $O(n^2)$, such as MVSC, AMGL, MLRSSC, and FMR. The LMVSC methods also perform $O(n)$ space complexity, but they must construct a graph for each view, which will be higher than the uniform space footprint of this embodiment. The high time and space complexity limits the size of many multi-view subspace clusters, making them suitable only for relatively small datasets. The comparison of the algorithms on the largest dataset in the report is shown in Table 2, which reflects to some extent the efficiency of the proposed algorithm.

The benchmark dataset used in this embodiment is shown in Table 3, and Caltech101-all and NUSWIDEOBJ are both object image datasets. CCV is a rich YouTube video database, containing 20 semantic categories. The SUNRGBD dataset is densely annotated. The animal dataset with attributes is referred to as AwA. YouTubeFace is a database of facial videos obtained from YouTube.

TABLE 3

| Information of benchmark datasets | | | | |
|---|---|---|---|---|
| Dataset | Sample | View | Cluster | Feature |
| Caltech101-20 | 2386 | 6 | 20 | 48, 40, 254, 1984, 512, 928 |
| CCV | 6773 | 3 | 20 | 20, 20, 20 |
| Caltech101-all | 9144 | 5 | 102 | 48, 40, 254, 512, 928 |
| SUNRGBD | 10355 | 2 | 45 | 4096, 4096, 4096 |
| NUSWIDEOBJ | 30000 | 5 | 31 | 65, 226, 145, 74, 129 |
| AwA | 30475 | 6 | 50 | 2688, 2000, 252, 2000, 2000 |
| YouTubeFace | 101499 | 5 | 31 | 64, 512, 64, 647, 838 |

Comparing Algorithms:

Multi-view K-means (RMKM) clustering algorithm is applied to large datasets. This work is a robust large-scale multi-view clustering method that integrates heterogeneous representations of large-scale data.

Multi-view subspace clustering (MVSC) algorithm. An effective multi-view subspace clustering method is provided, and the effectiveness of this algorithm is verified.

Parameter-free automatic weighted multi-graph learning: a framework for clustering algorithms for multi-view clustering and semi-suggestion classification (AMGL). Provided is a framework which automatically learns the optimal weight of each graph and obtains a global optimal result.

Multi-view low-rank sparse subspace clustering (MLRSSC) algorithm. This work learns the subspace representation by constructing affinity matrices that are shared across all views and solves the associated low-rank and sparse constraint optimization problem.

Flexible multi-view representation (FMR) learning for subspace clustering. This work flexibly encodes complementary information for different view encodings, thereby avoiding the use of partial information for data reconstruction.

Clustering algorithm based on partition level multi-view subspace clustering (PMSC). A unified multi-view subspace clustering model is provided, and the effectiveness of the algorithm is verified.

Multi-view clustering in latent embedding space based multi-view clustering algorithm (MLES). This algorithm can learn the global structure and the clustering index matrix at the same time, and then cluster multi-view data in a potential embedding space.

Large-scale multi-view subspace clustering (LMVSC) with linear time complexity. This algorithm is designed to process large-scale data and has linear complexity.

Experiment Setting:

In the experimental setting, the initialization of W, A and Z is set to zero matrix. Following the principle that the number of points required for the underlying subspace should not be less than the number of subspaces, the number of anchor m within the range of {k, 2k, 3k} and common dimensionality d=k is chosen. For fair comparison, the relevant code for the comparison algorithm is downloaded from original website. Since all methods need to use the k-means method to obtain the final clustering results, the k-means method is run 50 times to eliminate randomness in all comparison methods. The clustering performance is then evaluated by the widely used metrics Accuracy (ACC), normalized mutual information (NMI), Purity and FScore. In addition, the experimental environment is implemented on a desktop computer with Intel Core i7-7820X CPU and 64 GB memory, MATLAB 2020b (64 bits).

Clustering Performance:

This embodiment compares the algorithm SMVSC proposed in this embodiment with 8 multi-view subspace clustering algorithms on 7 widely used multi-view benchmark datasets. Tables 4 and 5 show detailed clustering In terms of ACC, the algorithm of this embodiment is superior to other most advanced multi-view clustering algorithms. The SMVSC exceeds the clustering algorithms with the same linear complexity (LMVSC) by 18%, 2%, 7%, and 1% over the four datasets, respectively. RMKM is a multiview k-means clustering algorithm that solves the problem of large-scale clustering, however SMVSC is 27%, 11%, 19%, and 1% higher than RMKM, respectively. In NMI, Purity, and Fscore, SMVSC can be nearly identical to other algorithms, exhibiting even better performance. In addition, there are no relevant results in Table 4 due to insufficient memory for some algorithms. It can be seen from FIG. 3, these two latest algorithms, MLES and PMSC, take tens of thousands of time per set of parameters on a dataset with a sample size of 2000, and then an error of insufficient memory occurs. Therefore, the experiments of these algorithms are not continued.

In FIG. 3, the methods and runtimes are compared on more than seven datasets. For clarity, the y-axis is scaled by taking the logarithm to mitigate the gap between some methods and the method in the present application. Missing bars indicate that the method encountered an error with insufficient memory on the experimental platform under this dataset.

It should be noted that, in FIG. 3, corresponding columns in each dataset are RMKM, MVSC, AMGL, MLRSSC, FMR, PMSC, MLES, LMCSC, and Ours in sequence from left to right, but it can be seen from FIG. 3 that only 9 columns in the first dataset exist, but the rest of datasets have empty positions, which also represent an algorithm, and then the columns in the rest of datasets are still arranged in the above sequence.

Figure 4A:
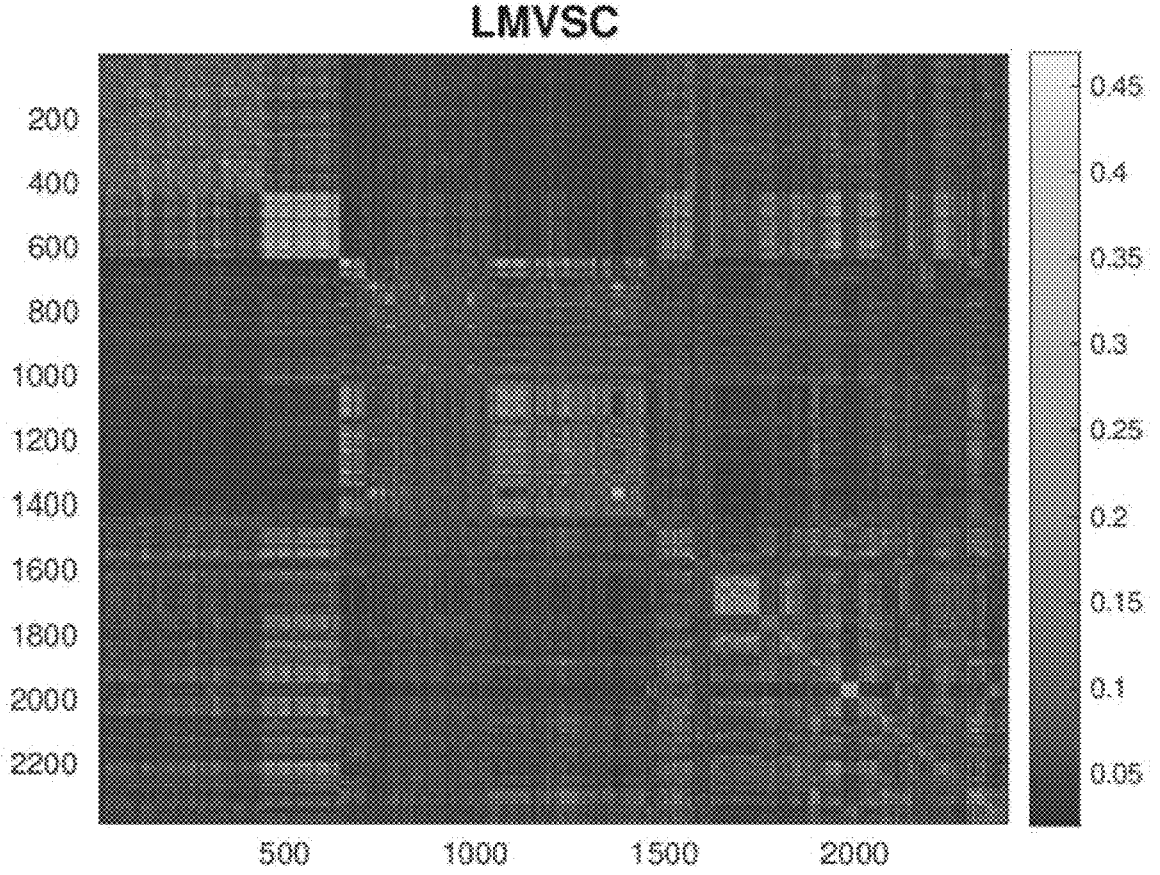
FIGS. 4A and 4B are schematic diagrams of comparing the graph structure of the LMVSC and the algorithm according to Embodiment 2 in Caltech101-20.
Figure 4B:
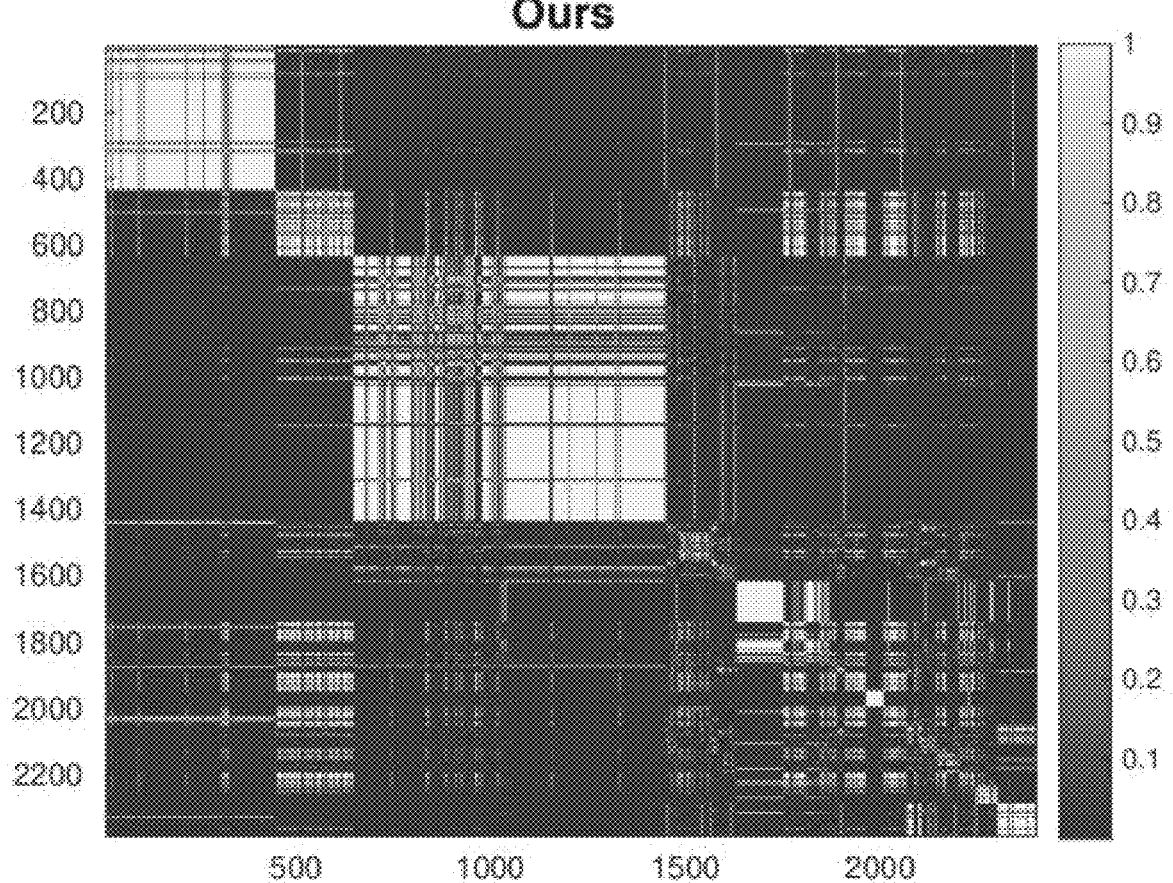
Figure 5C:
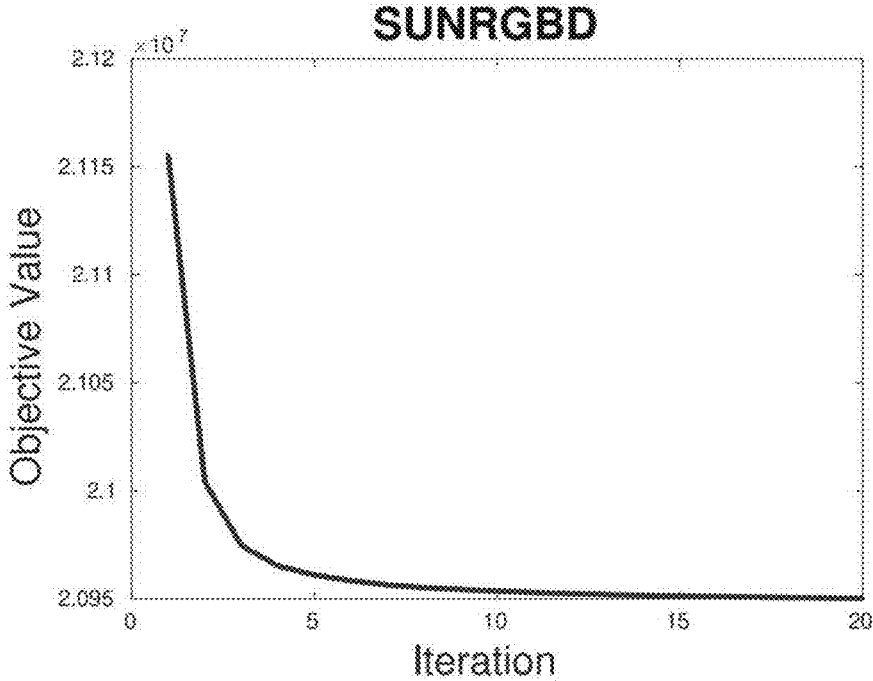
Figure 5D:
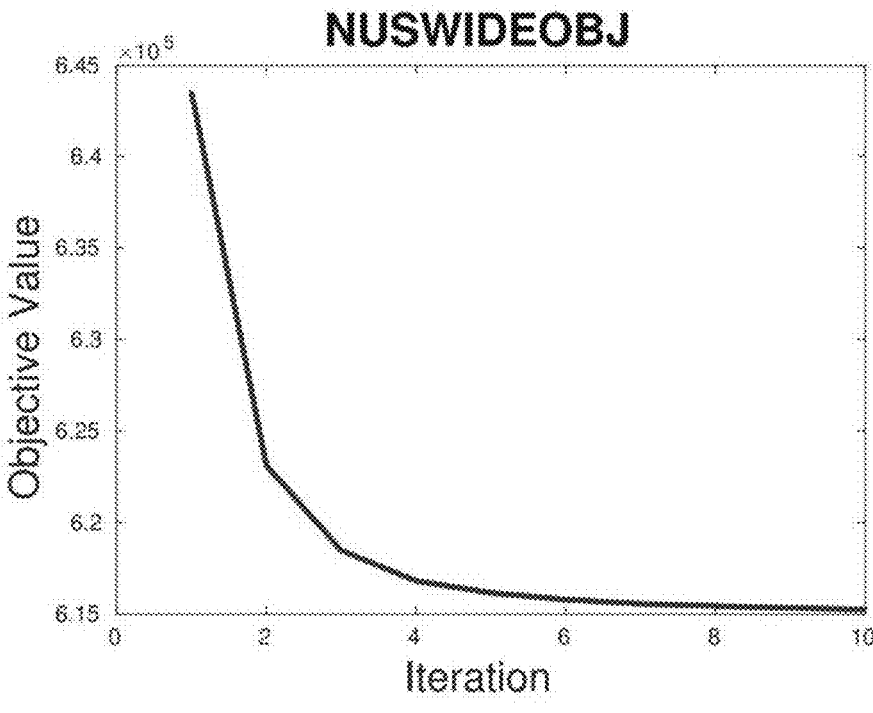
Figure 5E:
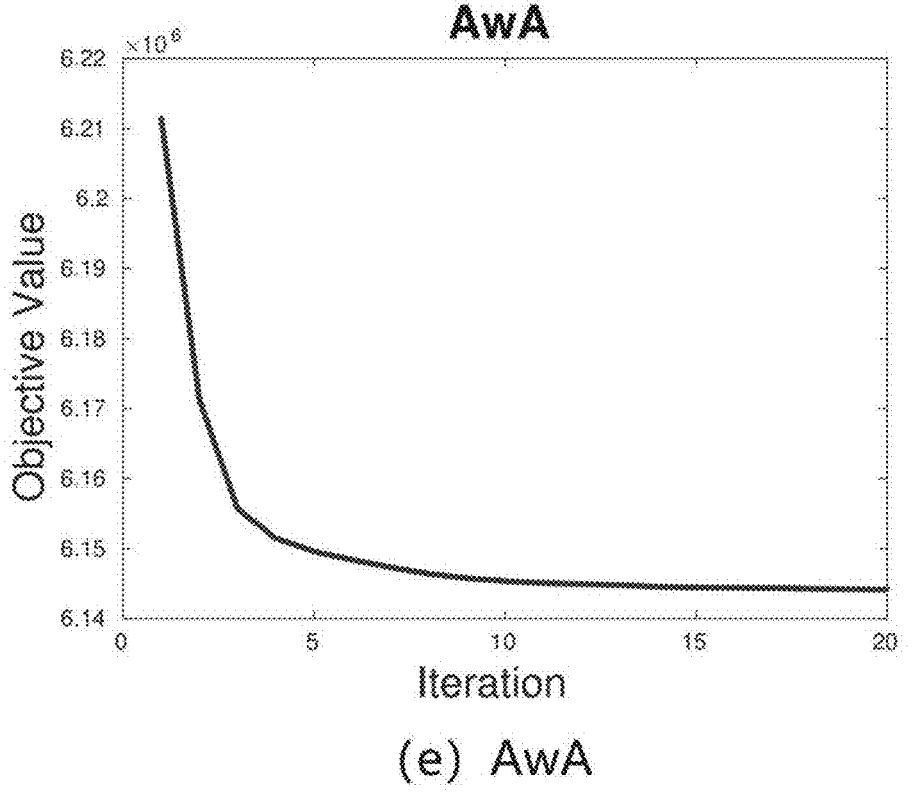

Furthermore, complete graphs are drawn in FIGS. 4A and 4B to illustrate the better learned clustering structure of this embodiment compared with the LMVSC in the graph. FIGS. 4A and 4B are diagrams of comparing the graph structure of the LMVSC and the algorithm of this embodiment on Caltech101-20. A brighter color means a larger value. The graph of this embodiment shows a clearer clustering structure and is less noisy compared with the LMVSC graph.

TABLE 4

| Dataset | Metric | RMKM | MVSC | AMGL | MLRSSC | FMR | PMSC | MLES | LMVSC | Ours |
|---|---|---|---|---|---|---|---|---|---|---|
| Caltech101-20 | ACC | 0.3345 | 0.508 | 0.1876 | 0.36 | 0.3873 | *0.5981* | 0.3495 | 0.4304 | 0.6132 |
| | NMI | 0 | 0.5271 | 0.1101 | 0.2008 | 0.5276 | 0.5244 | 0.3158 | *0.5553* | 0.5873 |
| | Purity | 0.3345 | *0.7125* | 0.6313 | 0.4476 | 0.7163 | 0.648 | 0.5268 | 0.7125 | 0.6999 |
| | Fscore | 0.2799 | 0.4329 | 0.4661 | 0.3069 | 0.3521 | *0.5474* | 0.2972 | 0.3414 | 0.6699 |
| CCV | ACC | 0.1044 | — | 0.1102 | 0.1259 | 0.1671 | — | — | *0.2014* | 0.2182 |
| | NMI | 0 | — | 0.0758 | 0.0471 | 0.1326 | — | — | *0.1657* | 0.1684 |
| | purity | 0.1044 | — | 0.2021 | 0.1307 | 0.211 | — | — | *0.2396* | 0.2439 |
| | Fscore | 0.1084 | — | *0.1215* | 0.1095 | 0.1018 | — | — | 0.1194 | 0.1307 |
| Caltech101-all | ACC | 0.0875 | — | 0.0359 | 0.1365 | — | — | — | *0.2005* | 0.275 |
| | NMI | 0 | — | 0.0187 | 0.1066 | — | — | — | 0.4155 | *0.351* |
| | Purity | 0.0875 | — | 0.4311 | 0.1371 | — | — | — | *0.3975* | 0.3395 |
| | Fscore | 0.0548 | — | 0.3617 | 0.0815 | — | — | — | 0.1586 | *0.2224* |
| SUNRGBD | ACC | 0.1836 | — | 0.0643 | 0.1741 | — | — | — | *0.1858* | 0.193 |
| | NMI | 0.2612 | — | 0.0371 | 0.1108 | — | — | — | *0.2607* | 0.2007 |
| | purity | *0.3771* | — | 0.2411 | 0.1741 | — | — | — | 0.3818 | 0.2971 |
| | Fscore | 0.1168 | — | 0.1894 | 0.1453 | — | — | — | 0.1201 | *0.1279* | performance results, where the best results are marked as bold, the sub-best results are marked as italics, "–" means a failure with insufficient memory.

Clustering Performance on Datasets With a Sample Size of 10,000 and Below:

Caltech101-20, CCV, Caltech101-all and SUNGRBD datasets with different sample sizes are selected as shown in Table 4.

Since the anchor graph of each view in the LMVSC is independently learned, they are connected to form a vm×n anchor graph Ŝ, and then a complete graph $\hat{S}^T\hat{S}$ is constructed. The complete graph can be obtained directly from the unified anchor graph $Z^TZ$. As shown in FIGS. 4A and 4B, the graph of this embodiment shows a clearer block structure, while the graph in LMVSC seems to be noisier and less clear.

15

16

Clustering Performance on Datasets With a Sample Size of More Than 30,000:

For better application to large scale scenarios, NUS-WIDEOBJ, AwA and YouTubeFace with a sample size of more than 30,000 are selected.

In the experimental process, except for the algorithm for solving large-scale data, all multi-view subspace clustering algorithms directly have the problem of "insufficient memory". Thus, these algorithms have no clustering performance for the above dataset in Table 5.

Based on the experimental results in Table 5, the proposed SMVSC still maintains good clustering performance on these larger datasets. On a 100,000-sample dataset of You-TubeFace, SMKSC improves by 11%, 10%, 5%, and 4% compared with LMVSC on ACC, NMI, Purity, and F score, respectively. These results indicate that the algorithm of this embodiment has a lower space complexity when processing almost twice as fast as some algorithms. Although AMGL and MLRSSC work well for datasets with 10,000 samples and below, they consume too much time cost. More importantly, the clustering of these two algorithms does not perform satisfactorily in comparison. On larger datasets, the clustering performance of SMVSC and large-scale-oriented multi-view subspace clustering (LMVSC) algorithm is more impressive, although both have a linear complexity. Although LMVSC is the fastest in most datasets, the mean sampling strategy and equal weight combination used are not conducive to the exchange of complementary information among views.

These results demonstrate that the linear time complexity of SMVSC is easier to scale to large-scale data, while some multi-view subspace clustering algorithms take a long time when processing large-scale data.

TABLE 6

| Method | Caltech101-20 | | CCV | | Caltech101-all | | SUNRGBD | |
|---|---|---|---|---|---|---|---|---|
| | Time | Speed | Time | Speed | Time | Speed | Time | Speed |
| RMKM | 27.74 | 6590.60× | 55.84 | 142.21× | 526.86 | 22.91× | 232.39 | 99.04× |
| MVSC | 30259.00 | 6.04× | — | — | — | — | — | — |
| AMGL | 25.60 | 7139.90× | 1544.30 | 5.14× | 1897.20 | 6.36× | 4293.30 | 5.36× |
| MLRSSC | 261.99 | 697.77× | 549.44 | 14.45× | 12068.00 | 1.00× | 23015.00 | 1.00× |
| FMR | 423.21 | 431.96× | 7940.90 | 1.00× | — | — | — | — |
| PMSC | 3399.70 | 53.77× | — | — | — | — | — | — |
| MLES | 182810.00 | 1.00× | — | — | — | — | — | — |
| LMVSC | 11.95 | 15294.07× | 21.20 | 374.50× | 48.85 | 247.04× | 31.82 | 723.6× |
| Ours | 9.91 | 18451.31× | 17.29 | 459.28× | 89.24 | 135.24× | 96.96 | 237.38× | large-scale data, and is superior to similar algorithms in terms of stability and precision.

Table 5 shows the clustering performance of the comparison methods under more than 30,000 sample datasets. Other competitive algorithms have been in memory. "–" indicates a failure with insufficient memory. The best results are in bold, italics indicate a second or no statistical difference.

TABLE 5

| Dataset | Metric | RMKM | LMVSC | Ours |
|---|---|---|---|---|
| NUSWIDEOBJ | ACC | 0.1193 | *0.1583* | 0.1916 |
| | NMI | 0.0926 | 0.1337 | *0.1272* |
| | Purity | 0.2062 | 0.2488 | *0.2331* |
| | Fscore | 0.0750 | *0.0990* | 0.1365 |
| AwA | ACC | 0.0656 | *0.0770* | 0.0878 |
| | NMI | 0.0738 | *0.0879* | 0.1061 |
| | Purity | 0.0849 | *0.0957* | 0.0993 |
| | Fscore | 0.0359 | *0.0378* | 0.0636 |
| YouTubeFace | ACC | — | *0.1479* | 0.2587 |
| | NMI | — | *0.1327* | 0.2292 |
| | Purity | — | *0.2816* | 0.3321 |
| | Fscore | — | *0.0849* | 0.1287 |

Runtime:

For a fair comparison, all algorithms are uniformly set to perform k-means 50 times, and the runtime for the optimal parameter set is reported. FIG. 3 shows the distribution of runtime on all datasets. Some algorithms do not have experimental results on some datasets, and therefore, there is no corresponding histogram in this figure. It can be seen that the runtime of the SMVSC is very advantageous and more details about runtime and acceleration are recorded in Tables 6 and 7.

It can be seen from Tables 6 and 7, the speed of the SMVSC is significantly better than the other algorithms and

TABLE 7

| Method | NUSWIDEOBJ | | AwA | | YouTubeFace | |
|---|---|---|---|---|---|---|
| | Time | Speed | Time | Speed | Time | Speed |
| RMKM | 379.32 | 1.00× | 774.64 | 1.00× | — | — |
| LMVSC | 107.54 | 3.57× | 158.57 | 4.89× | 207.92 | 6.50× |
| Ours | 147.75 | 2.57× | 286.77 | 2.70× | 1351.50 | 1.00× |

Convergence:

As described in the method section, the algorithm of this embodiment is theoretically guaranteed to converge to a local optimal value. The algorithm is recorded on each data set to show the experimental convergence of this embodiment. Due to space constraints, the evolution of the target values is plotted only on five datasets Caltech101-20, Caltech101-all, SUNRGBD, NUSWIDEOBJ, and AwA, as shown in FIGS. 5A-5E. The target value decreases monotonically in each iteration and usually converges in less than 20 iterations, and most datasets can converge in less than 10 iterations. These results verify the convergence of this algorithm experimentally.

This embodiment provides a scalable multi-view subspace clustering algorithm with unified anchors to solve the problem of clustering large-scale data. The algorithm adaptively learns the weight of each view and combines anchor learning and graph construction into a unified optimization framework. This enables the learned anchors to more accurately represent the actual underlying data distribution and to obtain a more discriminative clustering structure. The linear complexity and fast runtime of SMVSC make SMVSC more suitable for realistic large-scale application scenarios. Compared with the most advanced multi-view subspace clustering method and the multi-view subspace clustering method for large-scale tasks, a large number of experiments have proved that SMVSC has linear time complexity while maintaining the same or even better clustering performance.

Embodiment 3

This embodiment provides a spectral clustering system based on unified anchor and subspace learning, which includes:

an acquisition module configured to acquire a clustering task and a target data sample;

a construction module configured to perform unified anchor learning on multi-view data corresponding to the acquired clustering task and the acquired target data sample, and adaptively construct an objective function corresponding to an anchor graph according to a learned unified anchor;

an optimization module configured to optimize the constructed objective function by using an alternating optimization method to obtain an optimized unified anchor graph; and a clustering module configured to perform spectral clustering on the obtained optimized unified anchor graph to obtain a final clustering result.

Further, the adaptively constructing an objective function corresponding to an anchor graph according to a learned unified anchor in the construction module is represented as:

$$\min_{\alpha, W_i, A, Z} \sum_{i=1}^{v} \alpha_i^2 \|X_i - W_i AZ\|_F^2 + \|Z\|_F^2$$

$$\text{s.t. } \alpha^T 1 = 1, W_i^T W_i = I_d, A^T A = I_m, Z \geq 0, Z^T 1 = 1$$

wherein $\alpha$ represents a weight of a view; $W_i$ represents an anchor projection matrix of the $i^{th}$ view; $A \in R^{d \times m}$ represents a unified anchor matrix, d represents a common dimension of an entire view, and m represents the number of anchors; z represents a unified anchor graph with m×n dimensions; v represents v views; $\alpha_i$ represents a weight of the $i^{th}$ view; $X_i \in R^{d_i \times n}$ represents the $i^{th}$ view of original data, $d_i$ represents a dimension of a corresponding view, and n represents the number of samples; $\alpha^T$ represents a transpose of $\alpha$;

$$W_i^T$$

represents a transpose of $W_i$; $Z^T$ represents a transpose of Z; $A^T$ represents a transpose of A; $I_d \in R^{d \times d}$ represents an identity matrix; $I_m \in R^{m \times m}$ represents an identity matrix; and 1 represents a vector with all elements being one.

Further, the optimizing the constructed objective function by using an alternating optimization method in the optimization module specifically includes:

fixing variables A, Z, and $\alpha_i$, wherein the optimization of $W_i$ in the objective function is represented as:

$$\min_{W_i} \sum_{i=1}^{v} \alpha_i^2 \|X_i - W_i AZ\|_F^2, \text{ s.t. } W_i^T W_i = I_d$$

updating A, and fixing $W_i$, Z, and $\alpha_i$, wherein the optimization of A in the objective function is represented as:

$$\min_{A} \sum_{i=1}^{v} \alpha_i^2 \|X_i - W_i AZ\|_F^2, \text{ s.t. } A^T A = I_m$$

updating Z, and fixing variables $W_i$, A, and $\alpha_i$, wherein the optimization of Z in the objective function is represented as:

$$\min_{Z} \sum_{i=1}^{v} \alpha_i^2 \|X_i - W_i AZ\|_F^2 + \|Z\|_F^2$$

$$\text{s.t. } Z \geq 0, Z^T 1 = 1$$

updating $\alpha_i$, and fixing other variables $W_i$, A, and Z, wherein $M_i = \|X_i - W_i AZ\|_F$, and the optimization of $\alpha_i$ in the objective function is represented as:

$$\min_{\alpha_i} \sum_{i=1}^{v} \alpha_i^2 M_i^2, \text{ s.t. } \alpha^T 1 = 1$$

It should be noted that the spectral clustering system based on unified anchor and subspace learning provided in this embodiment is similar to Embodiment 1. Details are not described herein again.

This embodiment integrates anchor learning and graph construction into a unified framework, so that the learned anchor can represent actual data distribution more accurately. Compared with existing anchor graph fusion strategies, an adaptive method is used to make consistent anchor graphs capture/obtain complementary information among views while learning the importance of different views.

It should be noted that the foregoing are merely some embodiments of the present application and applied technical principles. Those skilled in the art may understand that the present application is not limited to specific embodiments described herein, and those skilled in the art may make various significant changes, readjustments, and replacements without departing from the protection scope of the present application. Therefore, although the present application is described in detail by using the foregoing embodiments, the present application is not limited to the foregoing embodiments, and may further include more other equivalent embodiments without departing from the concept of the present application. The scope of the present application is determined by the scope of the appended claims.

What is claimed is:

1. A spectral clustering method based on unified anchor and subspace learning, comprising:

S1: acquiring a clustering task and a target data sample;

S2: performing unified anchor learning on multi-view data corresponding to the clustering task and the target data sample to obtain a learned unified anchor, and adaptively constructing an objective function corresponding to an anchor graph according to the learned unified anchor;

S3: optimizing the objective function by using an alternating optimization method to obtain an optimized unified anchor graph; and S4: performing spectral clustering on the optimized unified anchor graph to obtain a final clustering result;

wherein the step of adaptively constructing the objective function corresponding to the anchor graph according to the learned unified anchor in the step S2 is implemented as:

$$\min_{\alpha, W_i, A, Z} \sum_{i=1}^{v} \alpha_i^2 \| X_i - W_i A Z \|_F^2 + \| Z \|_F^2$$

$$\text{s.t. } \alpha^T 1 = 1, \ W_i^T W_i = I_d, \ A^T A = I_m, \ Z \geq 0, \ Z^T 1 = 1$$

wherein $\alpha$ represents a weight of a view: $W_i$ represents an anchor projection matrix of an $i^{th}$ view; $A \in R^{d \times m}$ represents a unified anchor matrix, d represents a common dimension of an entire view, and m represents a number of anchors; z represents a unified anchor graph with m×n dimensions; v represents v views; $\alpha_i$ represents a weight of the $i^{th}$ view; $X_i \in R^{d_i \times n}$ represents the $i^{th}$ view of original data, $d_i$ represents a dimension of a corresponding view, and n represents a number of samples; $\alpha^T$ represents a transpose of a; $W_i^T$ represents a transpose of $W_i$; $Z^T$ represents a transpose of Z; $A^T$ represents a transpose of A; $I_d \in R^{d \times d}$ represents an identity matrix; $I_m \in R^{m \times m}$ represents an identity matrix; and 1 represents a vector with all elements being one;

wherein the step of optimizing the objective function by using the alternating optimization method in the step S3 comprises:

A1: updating $W_i$, and fixing variables A, Z, and $a_i$, wherein an optimization of $W_i$ in the objective function is represented as:

$$\min_{W_i} \sum_{i=1}^{v} \alpha_i^2 \| X_i - W_i A Z \|_F^2, \text{ s.t. } W_i^T W_i = I_d$$

A2: updating A, and fixing $W_i$, Z, and $a_i$, wherein an optimization of A in the objective function is represented as:

$$\min_{A} \sum_{i=1}^{v} \alpha_i^2 \| X_i - W_i A Z \|_F^2, \text{ s.t. } A^T A = I_m$$

A3: updating Z, and fixing variables $W_i$, A, and $\alpha_i$, wherein an optimization of Z in the objective function is represented as:

$$\min_{Z} \sum_{i=1}^{v} \alpha_i^2 \| X_i - W_i A Z \|_F^2 + \| Z \|_F^2$$

$$\text{s.t. } Z \geq 0, \ Z^T 1 = 1$$

A4: updating $\alpha_i$, and fixing other variables $W_i$, A, and Z, wherein an optimization of $\alpha_i$ in the objective function is represented as:

$$\min_{\alpha_i} \sum_{i=1}^{v} \alpha_i^2 M_i^2, \text{ s.t. } \alpha^T 1 = 1$$

wherein $M_i = \| X_i - W_i A Z \|_F$ represents reconstruction loss of $x_i$.

2. The spectral clustering method based on unified anchor and subspace learning according to claim 1, wherein the step A1 further comprises:

removing items irrelevant to $W_i$ by a Frobenius norm, and converting the formula in the step A1 into an equivalent problem represented as follows:

$$\min_{W_i} T_r(W_i^T B_i), \text{ s.t. } W_i^T W_i = I_d$$

wherein $B_i = X_i Z^T A^T$ represents a product of matrices.

3. The spectral clustering method based on unified anchor and subspace learning according to claim 1, wherein the step A2 further comprises:

removing items irrelevant to A by the a Frobenius norm, and converting the formula in the step A2 into an equivalent problem represented as follows:

$$\max_{A} T_r(A^T C), \text{ s.t. } A^T A = I_m$$

wherein $$C = \sum_{i=1}^{v} \alpha_i^2 W_i^T X_i Z^T$$

represents a product of matrices.

4. The spectral clustering method based on unified anchor and subspace learning according to claim 1, wherein the step A3 further comprises:

solving a solution to each row of Z by a QP problem, wherein the formula in the step A3 is represented as:

$$\min \frac{1}{2} Z_{:,j}^T H Z_{:,j} + f^T Z_{:,j}$$

$$\text{s.t. } Z \geq 0, \ Z_{:,j}^T 1 = 1$$

wherein j represents each column element in a matrix.

5. The spectral clustering method based on unified anchor and subspace learning according to claim 1, wherein the objective function is optimized by using the alternating optimization method in the step S3, wherein a termination condition is to find a minimum value or to reach a convergence condition.

6. A spectral clustering system based on unified anchor and subspace learning, comprising:

an acquisition module configured to acquire a clustering task and a target data sample;

a construction module configured to perform unified anchor learning on multi-view data corresponding to the clustering task and the target data sample to obtain a learned unified anchor, and adaptively construct an objective function corresponding to an anchor graph according to the learned unified anchor;

an optimization module configured to optimize the objective function by using an alternating optimization method to obtain an optimized unified anchor graph; and a clustering module configured to perform spectral clustering on the optimized unified anchor graph to obtain a final clustering result;

wherein the step of adaptively constructing the objective function corresponding to the anchor graph according to the learned unified anchor in the construction module is implemented as:

$$\min_{\alpha, W_i, A, Z} \sum_{i=1}^{v} \alpha_i^2 \|X_i - W_i A Z\|_F^2 + \|Z\|_F^2$$

$$\text{s.t. } \alpha^T 1 = 1, W_i^T W_i = I_d, A^T A = I_m, Z \geq 0, Z^T 1 = 1$$

wherein $\alpha$ a represents a weight of a view; $W_i$ represents an anchor projection matrix of an $i^{th}$ view; $A \in R^{d \times m}$ represents a unified anchor matrix, d represents a common dimension of an entire view, and m represents a number of anchors; z represents a unified anchor graph with m×n dimensions; v represents v views; $\alpha_i$ represents a weight of the $i^{th}$ view; $X_i \in R^{d_i \times n}$ represents the $i^{th}$ view of original data, $d_i$ represents a dimension of a corresponding view, and n represents a number of samples; $\alpha^T$ represents a transpose of $\alpha$; $W_i^T$ represents a transpose of $W_i$; $Z^T$ represents a transpose of Z; $A^T$ represents a transpose of A; $I_d \in R^{d \times d}$ represents an identity matrix; $I_m \in R^{m \times m}$ represents an identity matrix; and 1 represents a vector with all elements being one; wherein the step of optimizing the objective function by using the alternating optimization method in the optimization module comprises:

$$\min_{W_i} \sum_{i=1}^{v} \alpha_i^2 \|X_i - W_i A Z\|_F^2, \text{ s.t. } W_i^T W_i = I_d$$

updating A, and fixing $W_i$, Z, and $\alpha_i$, wherein the optimization of A in an objective function is represented as:

$$\min_{A} \sum_{i=1}^{v} \alpha_i^2 \|X_i - W_i A Z\|_F^2, \text{ s.t. } A^T A = I_m$$

updating Z, and fixing variables $W_i$, A, and $\alpha_i$, wherein an optimization of Z in the objective function is represented as:

$$\min_{Z} \sum_{i=1}^{v} \alpha_i^2 \|X_i - W_i A Z\|_F^2 + \|Z\|_F^2$$

$$\text{s.t. } Z \geq 0, Z^T 1 = 1$$

updating $\alpha_i$, and fixing other variables $W_i$, A, and Z, wherein the optimization of $\alpha_i$ in the objective function is represented as:

$$\min_{\alpha_i} \sum_{i=1}^{v} \alpha_i^2 M_i^2, \text{ s.t. } \alpha^T 1 = 1$$

wherein $M_i = \|X_i - W_i A Z\|_F$ represents reconstruction loss of $x_i$.

* * * * *